United States Patent [19]

Baugh

[11] Patent Number: 4,652,906

[45] Date of Patent: Mar. 24, 1987

[54] METHOD AND APPARATUS FOR COLOR DECOMPOSITION OF VIDEO SIGNALS

[75] Inventor: Charles R. Baugh, Plantation, Fla.

[73] Assignee: Racal Data Communications Inc., Sunrise, Fla.

[21] Appl. No.: 711,116

[22] Filed: Mar. 12, 1985

[51] Int. Cl.[4] .......................... H04N 5/93; H04N 9/78
[52] U.S. Cl. ........................................ 358/22; 358/31; 358/11; 358/78
[58] Field of Search ........................ 358/30, 31, 12, 22, 358/78, 80, 37

[56] References Cited

U.S. PATENT DOCUMENTS

| | | | |
|---|---|---|---|
| 3,617,626 | 11/1971 | Bluth et al. | 358/37 |
| 3,871,019 | 3/1975 | Bingham | 358/12 |
| 3,878,559 | 4/1975 | Pugsley | 358/78 |
| 3,893,166 | 7/1975 | Pugsley | 358/80 |
| 3,956,583 | 5/1976 | Pugsley | 358/78 |
| 3,975,761 | 8/1976 | Taudt et al. | 358/78 |
| 4,060,829 | 11/1977 | Sakamoto | 358/78 |
| 4,075,662 | 2/1978 | Gall | 358/78 |
| 4,092,668 | 5/1978 | Knop | 358/78 |
| 4,127,870 | 11/1978 | Colditz | 358/78 |
| 4,161,749 | 7/1979 | Erlichman | 358/78 |
| 4,262,301 | 4/1981 | Erlichman | 358/78 |
| 4,270,141 | 5/1981 | Sakamoto | 358/78 |
| 4,305,093 | 12/1981 | Nasu | 358/78 |
| 4,307,962 | 12/1981 | Jung | 358/80 |
| 4,319,268 | 3/1982 | Yamada | 358/80 |
| 4,346,402 | 8/1982 | Pugsley | 358/80 |
| 4,363,037 | 12/1982 | Taudt | 358/296 |
| 4,364,080 | 12/1982 | Vidovic | 358/10 |
| 4,389,665 | 6/1983 | Nagao et al. | 358/37 |
| 4,430,675 | 2/1984 | Fujime | 358/342 |
| 4,514,760 | 3/1985 | Balaban et al. | 358/143 |
| 4,531,149 | 7/1985 | Lewis, Jr. | 358/31 |

FOREIGN PATENT DOCUMENTS 0068358  5/1983  European Pat. Off. .
1551229  8/1979  United Kingdom .

Primary Examiner—James J. Groody
Assistant Examiner—Robert M. Bauer
Attorney, Agent, or Firm—Jerry A. Miller

[57] ABSTRACT

In a method and apparatus for processing color video signals, a switching network controlled by a control computer initially applies a composite video signal to a single analog to digital converter for storage in a memory. The composite signal is then repeatedly retrieved from the memory in order to be sequentially decomposed into required color characteristics such as red, blue and green. The decomposed signal is also applied to the input of the switching network so that the control computer can alternately multiplex each of the three decomposed signals into the memory. In this manner, the composite red, blue and green information is sequentially stored in memory for manipulation by a signal processing computer. This eliminates the need for multiple analog to digital converters operating in parallel.

17 Claims, 3 Drawing Figures

METHOD AND APPARATUS FOR COLOR DECOMPOSITION OF VIDEO SIGNALS

BACKGROUND OF THE INVENTION

1. Field of the Invention

This invention relates generally to the field of digital video signal processing. More particularly, this invention relates to a method and apparatus for decomposing video signals utilizing analog to digital conversion.

2. Background of the Invention

In a number of existing color video systems such as the NTSC system used in the United States, the PAL system in use in much of Europe, the SECAM system used in France and custom or nonstandard systems, a composite video signal is used which contains both horizontal and vertical synchronizing pulses, both horizontal and vertical blanking pulses and video information. For color systems, these pieces of video information are normally encoded in order to achieve realistic color rendition. There are a number of ways of viewing the three pieces of information generally required for color video, but in each case information relating to brightness, hue and saturation may generally be derived. Brightness (luminance) relates to the position in which a particular color may be placed on a neutral gray scale. Hue relates to the specific color frequency which categorizes the color as red, green, blue, etc. Saturation is a measure of the degree of mixture of the color with white light so that a fully saturated color contains no white light and pastel colors contain relatively large amounts of white light.

The above information is primarily associated with the way in which the human eye interprets color. The information itself, however, can be encoded within a composite video signal in a number of possible ways. For example, the composite video signal may contain information on the relative content of each of three primary additive colors such as red, blue and green (or differential relationships among the three) or the signal maybe contain information about three subtractive primary colors such as yellow, cyan and magenta. In other techniques, actual luminance, saturation and hue information may be transmitted or, as is known in the art, chrominance, real illuminance and imaginary illuminance information or other types of information may be encoded in the composite video signal.

In any event, to achieve full natural color rendition, it is generally the case that at least three pieces of color information must be encoded into the composite video signal. If, however, less than full color spectral information is necessary, it is of course possible to only encode one or two pieces of such video information into the composite video signal.

In the field of image processing, a composite video signal often is decomposed into its constituent parts. If only a single field or frame of video is processed, then in some cases the real-time video aspects are relaxed and the system has a different architecture than would a real-time, full-motion video processing system.

Once the composite video signal is decomposed into its primary constituent parts, it can then be processed. The processing is often done in the digital domain where the analog video signal has been converted to a digital format. The digital processing of the video includes, but is not restricted to, a variety of operations such as:

"1. Compression, i.e. reduction of the number of bits to represent the image
2. Image Enhancement
3. Scene Decomposition
4. Edge Detection
5. Color Compensation
6. Color Alteration
7. Frequency Composition
8. Correlation
9. Optical Correction
10. Gray Scale Segmentation
11. Ghost Removal"

In order to perform any of a number of possible signal processing operations such as those above, it is desirable in many instances to be able to separate the color (or other) information from the composite video in order to individually manipulate each of the pieces of color information. This may be done by first simultaneously decomposing the three pieces of video information from the composite video signal and then converting that information to digital form for manipulation by a signal processing digital computer. The data after being manipulated can then be reassembled and converted back to analog information, if desirable, prior to display, transmission, etc.

One technique for accomplishing this is shown in FIG. 1 as system 10. In system 10, any one of a plurality of camera signals or other sources of composite video such as 12, 14, and 16 may be selected by an appropriate switch network 18 by selectively closing one of switches 18A, 18B or 18C. Switch 18 may be operated either by manual control or, as shown, by a control computer 20 which is responsive to a manual control panel 22.

An output 24 of switch network 18 provides a composite video signal to a decomposition network 25 (shown in broken lines) which may be represented as three separate decomposition networks 26, 28, and 30. In the example shown the composite video signal is decomposed into red, blue and green signals respectively. In addition, the composite video signal at output 24 is provided to synchronization detectors 32 which derive appropriate horizontal, vertical or other synchronization information from the composite signal and supplies that information to control computer 20 and decomposition networks 25 (26, 28 and 30).

Each of the decomposition networks 26, 28, and 30 respectively derive red, blue and green information from the composite video signal and applies that information to an input of one of three analog to digital converter circuits 34, 36 and 38. The outputs of each of these analog to digital converter circuits is coupled to a separate memory location wherein separate red, blue and green digital information is stored. Memory 40 may be representative of either three separate banks of memory in addition to various program memory, scratch pad memory, etc. or may also represent one larger bank of memory which is simply partitioned appropriately into separate memory segments 40A, 40B, 40C, and 40D wherein 40A contains red information, 40B contains blue information and 40C contains green information. Memory segment 40D may be used for program storage, scratch pad, etc. Memory segment 40D may be used by the control computer 20 and also by signal processing computer 42 for use in processing each of the individual red, blue, and green digital information. After the information has been processed, it may be desirable in some instances to convert the digital information back to analog using a digital to analog converter 44. Any digital signal can be used to derive the analog signal. A composite video signal may be derived by combining the red, blue and green and adding the appropriate control and synchronization waveforms before driving the analog to digital converter. This signal can be established and stored in memory segment 40D. The analog information may then be used to drive a CRT display or may be transmitted, etc.

By virtue of parallel processing utilizing three analog to digital converters 34, 36 and 38, the present system 10 may operate very rapidly to provide the necessary signal processing. However, such speed may be unnecessary when dealing with for example freeze frame types of video signals used for example in CAT scanning or teleconferencing wherein a single frame of video may be processed and transmitted. Also, since the cost of analog to digital converters is among the more expensive items in system 10, this system may be prohibitively expensive for some applications.

SUMMARY OF THE INVENTION

Accordingly, it is an object of the present invention to provide an improved method and apparatus for processing video signals.

It is another object of the present invention to provide a lower cost mechanism for processing video information.

It is another object of the present invention to reduce the number of digital to analog converters necessary in a video data processing system.

It is a further object of the present invention to provide a method and apparatus for digital processing of video images which overcomes the drawbacks present in the prior art systems.

These and other objects of the invention will become apparent to those skilled in the art upon consideration of the following description of the invention.

In one embodiment of the present invention a method for processing the digital representation of color video images includes the steps of converting a composite video signal to a composite digital signal. The composite digital signal is then stored in memory and retrieved so that it may be decomposed into a first decomposed signal. This first decomposed signal is then stored in memory. Preferably, the composite digital signal is then retrieved from memory a second time, decomposed into a second decomposed signal, and the second decomposed signal is then stored in memory. The composite digital signal may then be retrieved from memory a third time, decomposed into a third decomposed signal and the third decomposed signal may be stored in memory. The first, second and third decomposed signal are available in memory to be processed by an appropriate signal processing apparatus.

In another embodiment of the present invention an apparatus for processing video information includes a switching network for selectively coupling any of a number of inputs to an output and an analog to digital converter having an input connected to the switching networks output. A memory is coupled to the output of the analog to digital converter for storing digital information into a memory. A circuit for retrieving and decomposing information stored in the memory provides this decomposed information to a second of the switch networks inputs and a control network coupled to the switch networks selectively switches between the first and second input in order to provide the decomposed or the composite signal selectively to the memory.

The features of the invention believed to be novel are set forth with particularity in the appended claims. The invention itself however, both as to organization and method of operation, together with further objects and advantages thereof, may be best understood by reference to the following description taken in conjunction with the accompanying drawings.

DETAILED DESCRIPTION OF THE PREFERRED EMBODIMENT

Figure 1:
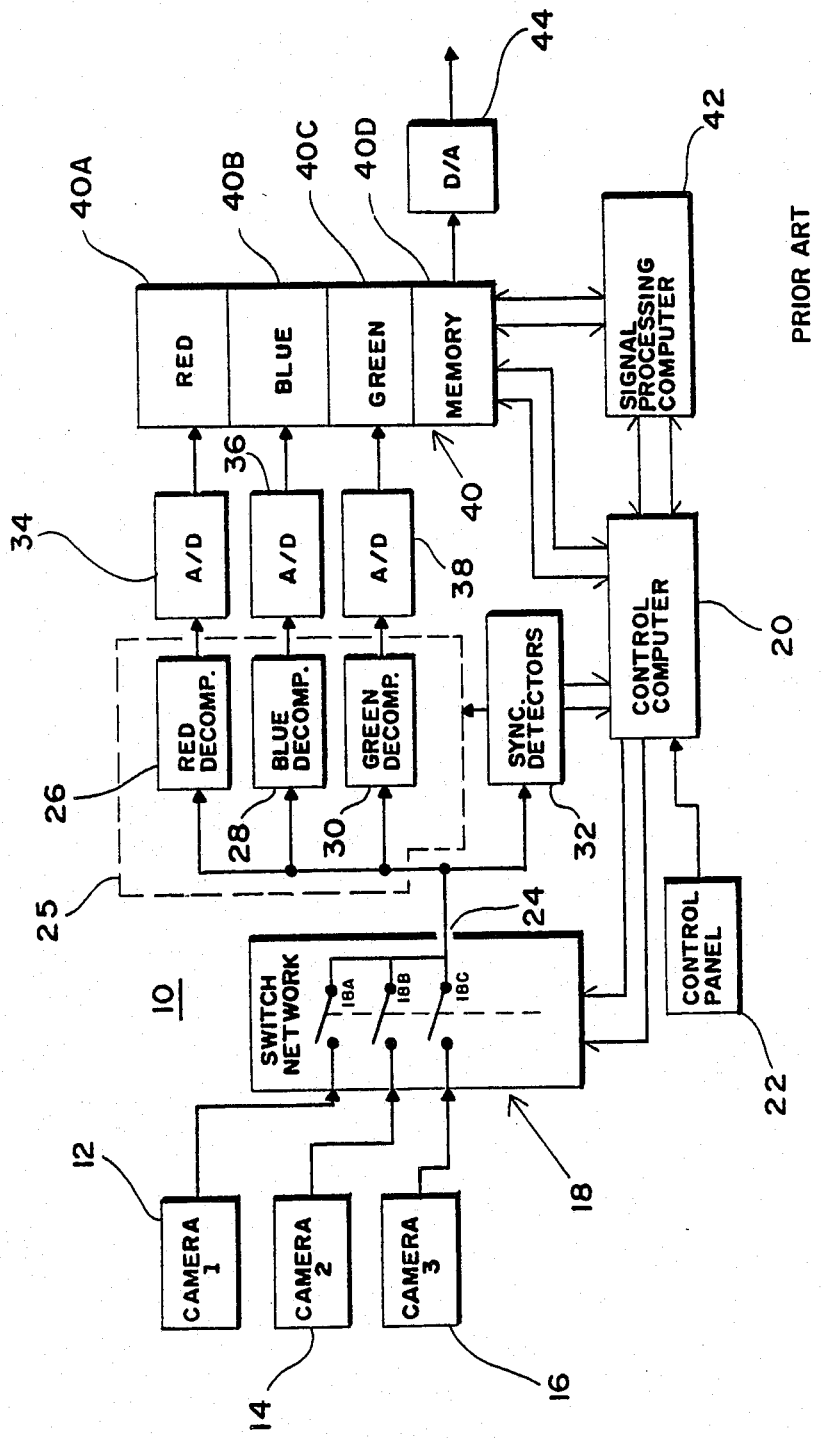
FIG. 1 shows an exemplary embodiment of a parallel processing video signal processing system using three parallel and analog digital converters.
Figure 2:
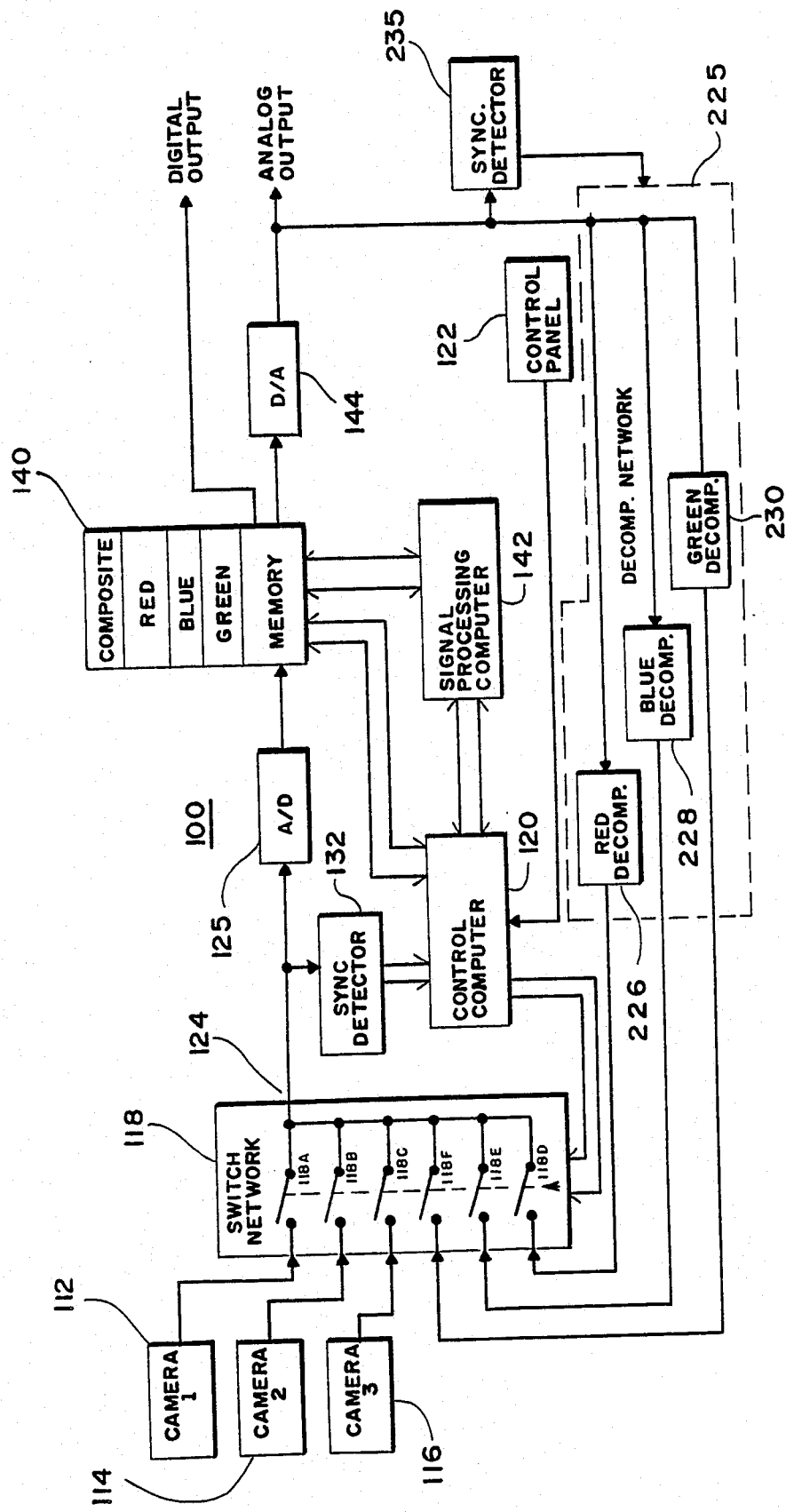
FIG. 2 shows a preferred embodiment of the present invention utilizing a single analog to digital converter.

Turning now to FIG. 2 of the drawings, a video system according to the present invention and designated 100 is shown. Several sources of color composite video information such as camera 112, camera 114, and camera 116 are coupled to a switch network 118. Switch network 118 includes switches 118A through 118C which are coupled, in the present example, to sources of composite video such as cameras 112, 114, and 116 respectively. The switches may be selectively actuated by a control computer 120 in order to couple the output of cameras 112, 114 or 116 to the output 124 of switch network 118. Output 124 supplies composite video from the selected camera to the input of the analog to digital converter 125. In addition, output 124 supplies composite video to synchronization detectors 132 which derive appropriate horizontal and/or vertical and/or color burst synchronization information from the composite video signal in a known manner and supplies it to control computer 120. The synchronization detectors 132 may be chosen according to the type of video to be processed or may be adaptive to accommodate a variety of types of video.

The digital output of analog to digital converter 125 is coupled to a memory network 140 which is also connected to control computer 120 and a signal processing computer 142. Control computer 120 may accept manual inputs from control panel 122 in order to determine which of cameras 112, 114, and 116 are coupled to analog to digital converter 125.

A digital to analog converter preferably receives the output of memory 140 and supplies an analog signal to a decomposition network 225 (shown in broken lines) which may include red, blue and green decomposition networks 226, 228, and 230. These networks are in turn coupled to switches 118D through 118F respectively of switch network 118. In this manner, the output of decomposition networks 226, 228, or 230 may also be coupled to the input of analog to digital converter 125 under the control of computer 120. A synchronization detector 235 may be needed to provide appropriate synchronization information to decomposition network 225 (226, 228 and 230).

In operation, the inputs to the analog to digital converter 125 is multiplexed by switch network 118 to provide appropriate signals to various portions of memory 140. By way of example, if control computer 120 selects 112 as a source of composite video, its composite video signal is switched through switch 118A to analog to digital converter 125. Analog to digital converter 125 converts the analog composite video signal to a digital composite signal which is then stored in memory 140 in a location set aside for the composite signal. The composite digital signal is then extracted from memory 140 to feed a digital to analog converter 114 which converts the composite signal back to its original analog signal. This analog signal is then supplied to the input of red decomposition network 226 which extracts red information from the composite signal. Control computer 120 then directs switch network 118 to open switch 118A and close switch 118D thereby directing the decomposed red signal to analog to digital converter 125. Under control of control computer 120, a digital representation of the red decomposed signal is then stored in memory 140 in a memory location designated for red information.

At this point the composite signal is once again recalled from memory 140 and supplied to digital to analog converter 114 for conversion back to an analog signal. Digital to analog converter 114 then supplies the composite signal to blue decomposition network 228 so that blue information is extracted from the composite signal. Under the control of control computer 120, switch 118D is opened and switch 118E is closed. Thereby providing the decomposed blue information from blue decomposition network 228 to analog to digital converter 225 where it is converted to digital information. This digital information is stored in memory 140 in an area designated for blue information.

Next, digital to analog converter 114 is supplied once again with the composite digital signal for conversion back to its original analog state. Digital to analog converter 144 provides this analog information to green decomposition network 230 so that green information may be extracted from the composite signal. Under the control of control computer 120, switch 118E is opened and switch 118F is closed so that the output of green decomposition network 230 is supplied to analog to digital converter 125 for conversion to digital. This digital representation of the green decomposed signal is then stored in the appropriate memory location in memory 140.

In the above manner, the composite signal may be decomposed sequentially into red, blue and green (or any other desired components) and stored in memory so that it may be manipulated by signal processing computer 142 in any desired manner. For example, color impurities may be removed or selected colors may be manipulated or changed to enhance contrast or clarity of a particular image. Once the signal processing computer has completed its task with the stored information in memory 140 it may be sent to digital to analog converter 144 for transmission or display of the visual image in analog form. It may alternatively be desirable to provide a digital output as shown in FIG. 2 to allow direct use of the digital representations of the composite and/or decomposed signals.

Of course it will be clear to those skilled in the art that signal processing counter 142 and control computer 120 may actually be one and the same computer which functions in both capacities previously described. Also, it will be clear that the present system may be readily adapted to manipulate more or less than three types of information (red, blue, and green) as shown in the exemplary embodiment. Also, it will be clear that the present system may be readily adapted to manipulate luminance and chrominance or other forms of encoded color information or even non-color information.

In the embodiment shown in FIG. 2, it should be understood that by way of example red, blue and green decomposition networks 226, 228, and 230 are assumed to be analog networks which operate on an analog composite video signal output of digital to analog converter 144. This is not to be limiting however since the inputs of each of the decomposition networks may directly receive the digital data from memory 140 (or from computer 142) and may act upon that information in a digital manner thereby avoiding the necessity of passing through digital to analog converter 144 if the circumstances dictate. However, since such decomposition networks are known in the art and popularly used in an analog form, this is the present preferable implementation. When digital information is more economically manipulated for purposes of decomposing the video signal, bypassing digital to analog converter 144 may be advantageous.

It is also possible for the present invention, under software control, to recognize more than one type of composite video input and to perform translations from one type to another. For example, the output of video source 112 may be PAL format. Upon storing that signal in memory 140, signal processing computer 142 can retrieve the composite signal and convert it to, for example, to NTSC format. In another embodiment, control computer 120 may determine how the ultimate output is to be formatted by combing the various composite and decomposed signals together with other internally generated signals in order to produce the desired outputs. One skilled in the art will readily appreciate that any number of such translation and reconstruction types of operations are possible within the scope of the present invention. Various other translations such as rectangular NTSC to polar may also be performed.

Figure 3:
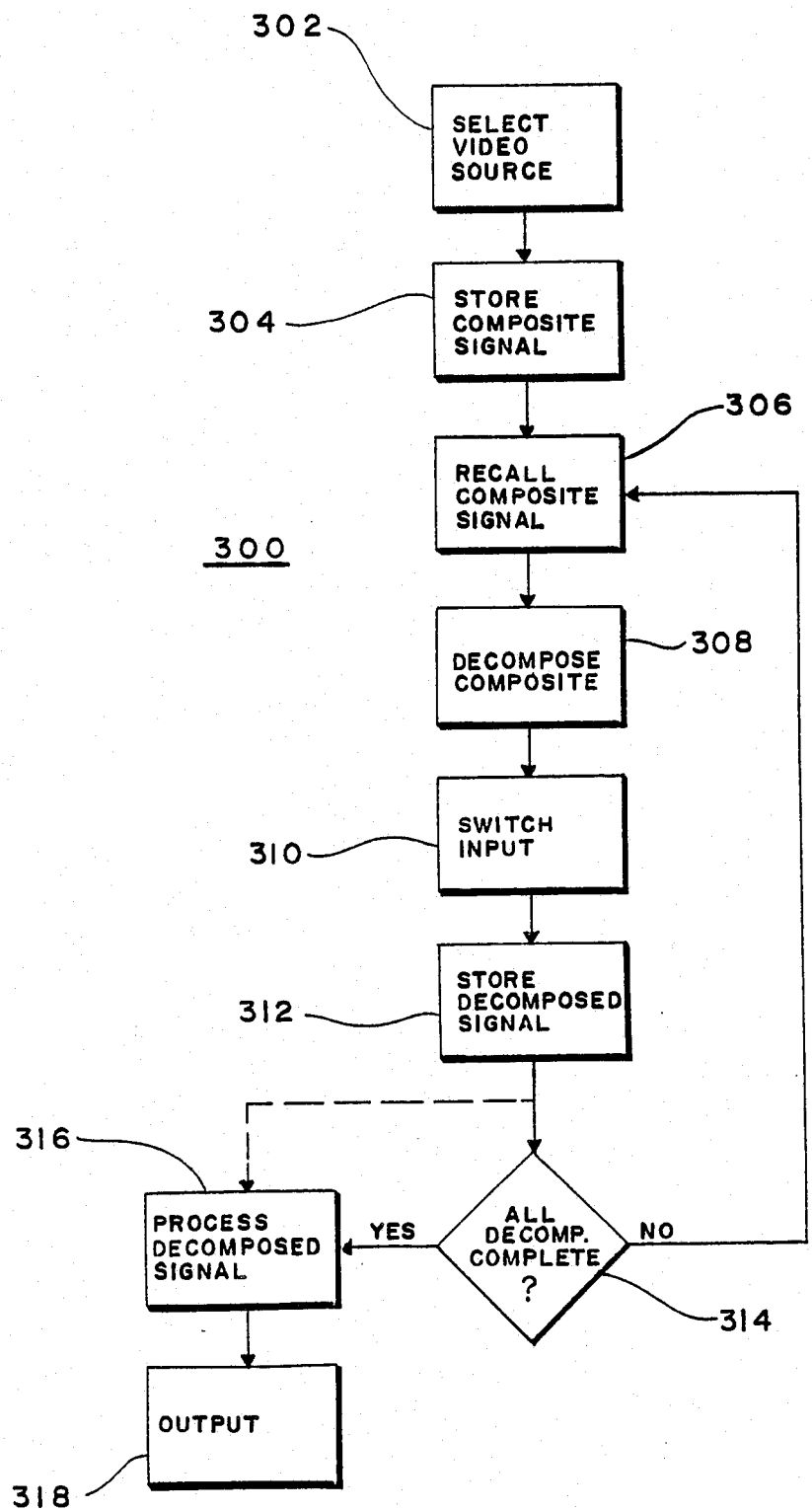
FIG. 3 shows a flowchart of the operation of the present invention.

The normal operation of the present invention may be summarized by reference to the flow chart of FIG. 3 labeled generally 300. In step 302, a video source, such as for example camera 112, is selected in order to provide the initial composite video signal to be operated upon. In step 304, the composite video is converted to digital form and stored in memory 140. The composite digital signal is recalled in step 306 and converted back to analog form if necessary. A decomposition or separation of the composite signal occurs in step 308.

In step 310, the input to the switching network is changed to route the decomposed signal to the analog to digital converter in preparation for storage in the memory at step 312. In step 314, if the decomposition is not complete, that is all decomposed signals have not yet been extracted from the composite, control returns to step 306 where the composite signal is once again recalled for the next decomposition step. If decomposition is completed in step 314, control goes to step 316 where the decomposed signals (and possibly the composite signal) is processed by the signal processing computer or other similar circuitry. It is also possible for the decomposed signal to be processed on step 316 as soon as each decomposed signal is stored in the memory as indicated by the broken line leading from step 312 to step 316. In any event, after processing of the signal is completed in step 316 an output may be taken in step 318.

Those skilled in the art may readily recognize that various analog switching networks such as metallic relays are suitable for use as switching network 118. In addition, any number of high speed memories integrated circuit RAM networks such as industry standard 4164 type 64 k×1 RAM chips may be suitable for implementing memory 140. Control computer 120 and signal processing computers 142 are preferably implemented utilizing microprocessor technology wherein microprocessors such as Advanced Micro Devices (TM) 2900 and Texas Instruments (TM) TMS 320 microprocessors respectively may be found suitable. The details of connecting and programming such computers are well within the skill of those familiar with such devices. Frame synchronization detector 132 may be implemented utilizing circuitry based around synchronization detection circuits such as the Third Domain (TM) RSS 102. Such circuits for decomposing the various color components of color video signals such as the Motorola (TM) MC1377 are also well-known in the art and widely available commercially. The analog to digital converter 125 preferably operates at approximately 15 to 20M samples per second for a 7M Hz bandwidth video signal and provides an eight bit binary output to memory 140 but this is, of course, not to be limiting. This allows for samples of the composite video and decomposed video signals to be taken at a rate which is sufficient for purposes of still frame video according to the preferred use for the present invention. Similarly, digital to analog converter 144 is an eight bit converter which may be operated at approximately the same rate.

Thus, it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. For example, equivalent hardware or software based embodiments may be developed. Also, it may be possible to perform decomposition and switching functions within a more powerful signal processing computer so that the cycling and multiplexing operations disclosed actually take place within the computer as technology and economics permit. Accordingly, it it intended that the present invention embrace all such alternatives, modifications and variations as fall within the spirit and broad scope of the appended claims.

What is claimed is:

1. A method for decomposing signals representative of video images based upon the color composition of said signals, comprising the steps of:
converting a composite video signal to a composite digital signal;
storing said composite digital signal in a first memory location of a memory;
retrieving said composite digital signal from said location memory;
color decomposing said composite digital signal into a first decomposed signal;
storing said first decomposed signal in a second memory location of said memory;
retrieving said composite digital signal from said memory a second time;
color decomposing said composite digital signal into a second decomposed signal;
storing said second decomposed signal in a third memory location of said memory; and
wherein said first second and third memory locations are each different portions of said memory.

2. The method of claim 1, further including the steps of:
retrieving said composite digital signal from said memory a third time;
color decomposing said composite digital signal into a third decomposed signal; and
storing said third decomposed signal in a fourth memory location of said memory, said fourth memory location being a different portion of said memory from said first, second and third memory locations.

3. The method of claim 2, wherein said first, second and third decomposed signals contain red, blue and green information respectively.

4. The method of claim 2, wherein the first, second and third decomposed signals contain yellow, cyan and magenta information respectively.

5. The method of claim 2, wherein said first, second and third decomposed signals contain luminance, saturation and hue information respectively.

6. The method of claim 2, wherein said first, second and third decomposed signals contain chrominance, real illuminance and imaginary illuminance information respectively.

7. The method of claim 2, further including the steps of:
retrieving said first, second and third decomposed signals from said memory;
processing said first, second and third decomposed signals; and
returning said processed first, second and third decomposed signals to memory.

8. The method of claim 7, further including the step of:
returning the unprocessed first, second and third decomposed signals to said memory.

9. The method of claim 1, further including the step of:
processing one of said composed and decomposed signals to effect a change in composite video format.

10. A circuit arrangement for color decomposing signals representative of video images, comprising:
means for converting a composite video signal to a composite digital signal;
memory means having a plurality of different memory locations for storing said composite digital signal in a first memory location thereof;
means for retrieving said composite digital signal from said memory means;
first means for color decomposing said composite digital signal into a first decomposed signal;
means for storing said first decomposed signal in a second memory location of said memory means, said second memory location being different from said first memory location;
means for retrieving said composite digital signal from said memory means a second time;
second means for color decomposing said composite digital signal into a second decomposed signal; and
means for storing said second decomposed signal in a third memory location of said memory means, said third memory location being different from said first and second memory locations.

11. The circuit arrangement of claim 10, further including:
means for retrieving said composite digital signal from said memory means a third time;

third means for color decomposing said composite digital signal into a third decomposed signal; and means for storing said third decomposed signal in a fourth memory location of said memory means, said fourth memory location being different from said first, second and third memory locations.

12. The circuit arrangement of claim 11, wherein said first, second and third decomposed signals contain red, blue and green information respectively.

13. The circuit arrangement of claim 11, wherein said first, second and third decomposed signals contain yellow, cyan and magenta information respectively.

14. The circuit arrangement of claim 11, wherein said first, second and third decomposed signals contain luminance, saturation and hue information respectively.

15. The circuit arrangement of claim 11, wherein said first, second and third decomposed signals contain chrominance, real illuminance and imaginary illuminance information respectively.

16. The circuit arrangement of claim 11, further including:

means for retrieving said first, second and third decomposed signals from said memory means;

processing means for processing said first, second and third decomposed signals; and means for returning said processed first, second and third decomposed signals to said memory means.

17. An apparatus for processing video information, comprising:

a switching network, having a plurality of inputs and an output, for selectively coupling any of said plurality of inputs to said output;

an analog to digital converter having an input coupled to said output;

means for receiving a composite signal, coupled to a first of said plurality of inputs;

memory means for receiving and storing a digital output from said analog to digital converter;

means for retrieving information stored in said memory means;

means for decomposing said retrieved information into decomposed information and for applying said decomposed information to a second of said plurality of inputs; and control means, coupled to said switch network for selectively coupling said first and second inputs alternately to said switch network output.

* * * * *